ary Examiner—Andrew V. Kundrat
United States Patent
Morell

[11] 3,938,902
[45] Feb. 17, 1976

[54] CONNECTING DEVICE FOR WIRES

[76] Inventor: Juan Coll Morell, Calle Amilcar 209, Barcelona, Spain

[22] Filed: Aug. 19, 1974

[21] Appl. No.: 498,618

[30] Foreign Application Priority Data
Feb. 26, 1974 Spain .................................. 201309

[52] U.S. Cl. ................ 403/391; 403/314; 403/393; 174/84 S
[51] Int. Cl.² .......................................... F16B 2/14
[58] Field of Search ........... 403/314, 393, 374, 409, 403/368, 391; 24/25, 28, 136 B; 52/248, 193, 223 L, 230; 174/94 R, 94 S, 84 S; 339/273 R, 273 S; 217/93, 94, 95

[56] References Cited
UNITED STATES PATENTS

| 772,798 | 10/1904 | Giltner | 403/374 |
| 2,491,673 | 12/1949 | Lytle | 217/95 X |
| 3,137,971 | 6/1964 | Rhodes | 52/230 |
| 3,559,275 | 2/1971 | Slater | 52/223 L |
| R20,074 | 8/1936 | Stahl | 339/273 R |

Primary Examiner—Andrew V. Kundrat
Attorney, Agent, or Firm—Steinberg & Blake

[57] ABSTRACT

For connecting together two wires which are to be placed under tension in series connection, a connector has a rigid body pierced by two substantially parallel bores. The wires are passed through the bores and anchored against the tension at opposite ends of the body by suitable anchoring means. The lengths which are to be tensioned extend through the bores. Where a wire has ruptured under tension, the broken ends can be respectively connected to two such connectors, which are themselves joined by a supplementary length of wire. Tension can then be re-applied.

1 Claim, 7 Drawing Figures

CONNECTING DEVICE FOR WIRES

BACKGROUND OF THE INVENTION

FIELD OF THE INVENTION

This invention relates to improvements in or relating to connecting devices for two wires which are to be placed under tension, and also to methods of connecting wires, especially the two ends of a wire which has ruptures. In this specification and claims, the term wire is used to include cable and rope, to which the invention is also applicable.

In various technical fields, there are utilised anchored wire stays which are tensioned and are capable of rupturing under tension. Particularly in the case of pre-stressed construction reinforcements, rupture of a wire is extremely detrimental, inasmuch as replacement of the ruptured wire involves removal of the tensioning jacks being used which are generally bulky and heavy, extraction of the ruptured parts, introduction of the fresh wire (this being sometimes a difficult operation among a group of wires), and once again placing the tensioning jacks in position so as to again initiate the tensioning process.

An object of the present invention is to provide a connecting device for two wires which renders it unnecessary to replace the wire which has ruptured on being tensioned or to remove the tensioning jack from its operational position in order to effect the connection and to put the wire again into a condition suitable for tensioning.

SUMMARY OF THE INVENTION

According to the invention in one aspect there is provided a connecting device for two wires which are to be placed under tension in series connection, having a rigid block which has two opposite ends and two substantially parallel bores extending from one end to the other to receive the wires, and two anchoring means respectively associated with the bores adapted to anchor the tensioned lengths of the wires respectively at the opposite ends of the block against the applied tension when the said tensioned lengths extend through the bores.

According to the invention in another aspect, there is provided a method of connecting two wires which are to be placed under tension in series connection, comprising providing a connecting device comprising a rigid block which has two ends and two substantially parallel bores extending from one end to the other, passing the two wires respectively through the said bores and anchoring the wires against the tension by anchoring means provided at opposite ends of the block and arranged so that the lengths of both wires which are, or are to be, subjected to tension extend through the respective bores from the anchoring means.

In order to connect the ruptured ends of a wire which has ruptured tension and to which tension is to be reapplied, two connecting devices may be used, one of the ends being connected to each of them in the manner described above and the two devices being linked by a supplementary length of wire connected to both of them in the manner described above.

The anchoring means may comprise terminal sleeves or bushings riveted or otherwise secured permanently to the wires or wedges which are adapted to grip the wire and are located in tapering orifices. The anchoring means may seat on the end faces of the rigid block. Preferably each end face of the block has two facets through which respectively the said bores open, one of the facets being substantially perpendicular to the bore which opens through it and being for abutment by the associated anchoring means, and the other being at an angle to the bore which opens through it so that it is substantially perpendicular to the connected wires when outside the block they are lying coaxially.

Alternatively, the one end of each bore may be flaring, e.g. conically, in order to receive a gripping wedge for the wire.

BRIEF DESCRIPTION OF THE DRAWINGS

Embodiments of the invention in both aspects will now be described by way of non-limitative example with reference to the accompanying diagrammatic drawings, wherein.

DESCRIPTION OF THE PREFERRED EMBODIMENTS

Figure 1:
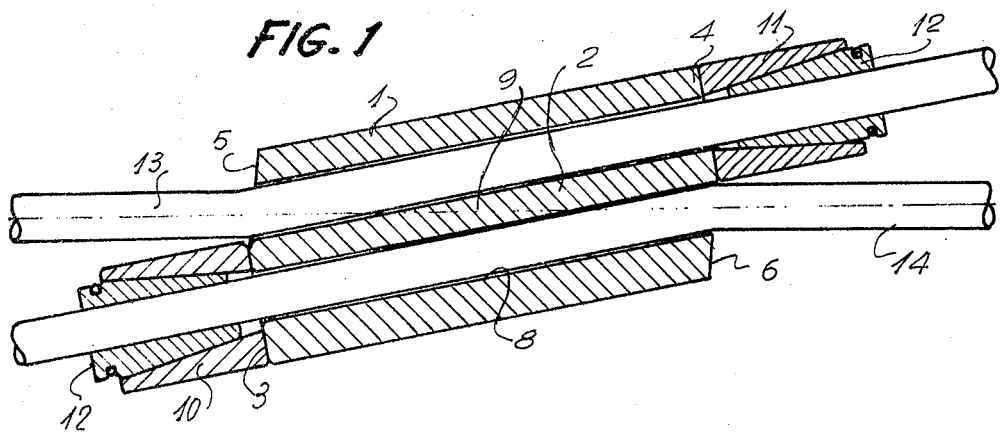
FIG. 1 shows a simple connection established with a connecting device embodying the invention.
Figure 2:
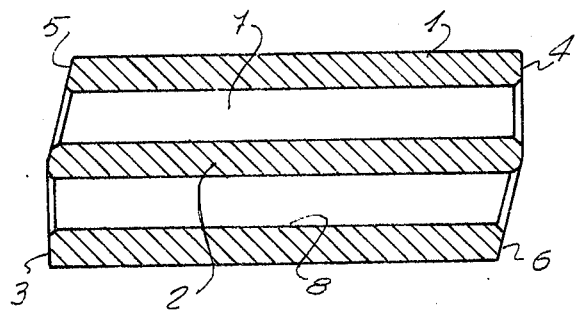
FIG. 2 shows the connecting device of FIG. 1 in longitudinal section.
Figure 3:
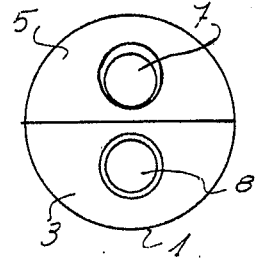
FIG. 3 is an end view from the left-hand side of FIG. 2.

Referring to FIGS. 1 to 4, the connecting device is constituted by an essentially cylindrical rigid block 1 having a core 2 of strong steel. The opposite ends have plane facets 3 and 4 perpendicular to the axis of the block and facets 5 and 6 which are also plane and are oblique relative to the adjacent plane facets 3 and 4. The facets 5 and 6 are parallel to each other. Longitudinally from end to end through the block extend two straight and parallel bores 7 and 8, each extending between one of the said plane facets 3, 4 and one of the oblique facets 5, 6 i.e. in one case between the facet 3 and the facet 6, and in the other case between the facet 4 and the facet 5.

The angle of the facets 5, 6 to the adjacent facets 3, 4 is such that the circular configurations corresponding to the mouths of the bores at the two facets 5, 6 are coaxial (as indicated by the line 9 in FIG. 1), this being for a purpose to be described later.

The faces 3 and 4 form seatings for anchoring means which, in the embodiment illustrated, are constituted by separate conical sleeves or bushings 10, 11 having associated split-sleeve gripping wedges 12 for retaining and anchoring the wires 13, 14.

The mode of functioning of the device will now be described. Assuming, with reference to FIG. 1, that reference numerals 13 and 14 indicate the two ends of wires which permit overlap thereof, the end 13 is introduced through the bore mouth associated with the facet 5, and the end 14 through the mouth of the facet 6, in such manner that both project respectively from the faces 4 and 3. Against the latter are applied the terminal members, i.e. the wedges 10 and 11 which are keyed in the conventional manner, and tensioning or re-tensioning of the assembly of connected wire is effected.

On applying tension to the two wires, they tend to adopt a coaxial position, as indicated in FIG. 1, this being facilitated by the presence of the oblique facets 5, 6, which become perpendicular to the common axis of the wires. The bends which form in the wires are minimal and may be reduced in effect still further by providing appropriate oblique edges or curved portions at the mouths of the bores.

If the two wires are ends of a wire which has ruptured re-tensioning of the stays may be effected at one of the ends thereof, in the same manner as initially effected prior to rupture, or (particularly in the embodiment shown wherein wedge terminals are employed) at the location of one of the said terminals.

Figure 4:
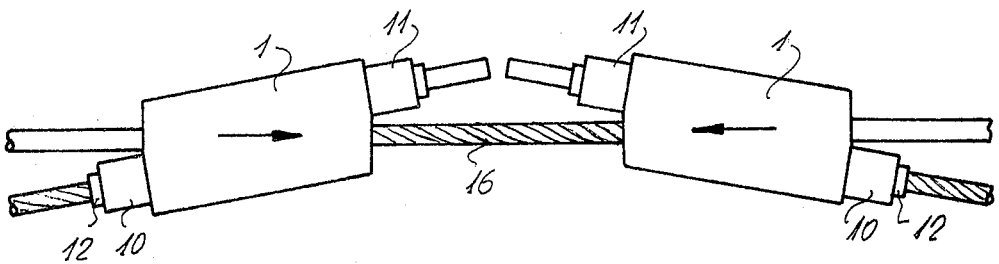
FIG. 4 shows a connection established with two connecting devices as shown in FIG. 1 and an intermediate section or length of connecting wire.

FIG. 4 shows how two of the connecting devices are employed to form a connection, each one being disposed on one of the wire ends adjacent the site of rupture and both being connected by means of a supplementary intermediate wire section or length 16. Tensioning may be applied at each of the free wire ends, provided that they are provided with wedge-type anchoring means, but it is also possible in this case to utilize a tensioning jack acting directly on the two blocks 1 in such manner as to cause them to approach each other.

In FIGS. 1 and 4, it can be seen how the series-connected pair of wires (or two pairs in FIG. 4) are anchored, against the tension applied, respectively at opposite ends of the block 1, with the tensioned portion in each case extending through the respective bores from the anchoring wedges and sleeves.

Figure 5:
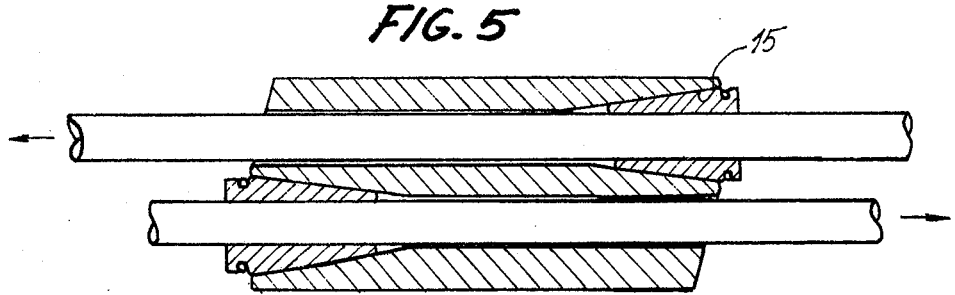
FIGS. 5 and 6 are each longitudinal sectional views of another connecting device embodying the invention, FIG. 5 being prior and FIG. 6 subsequent to the application of tension.
Figure 6:
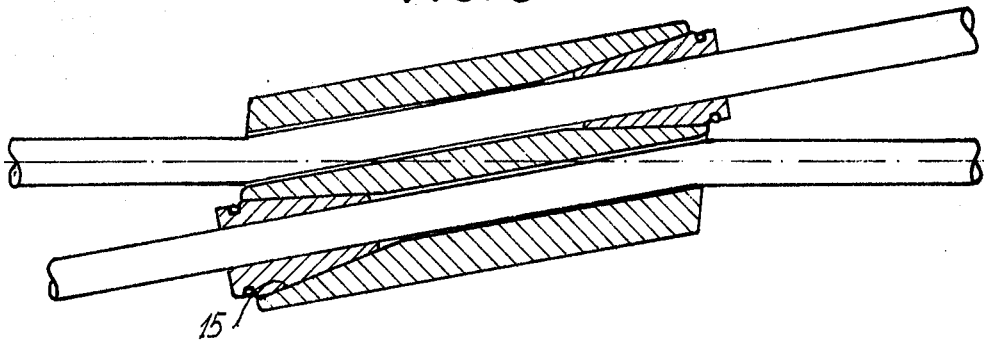
Figure 7:
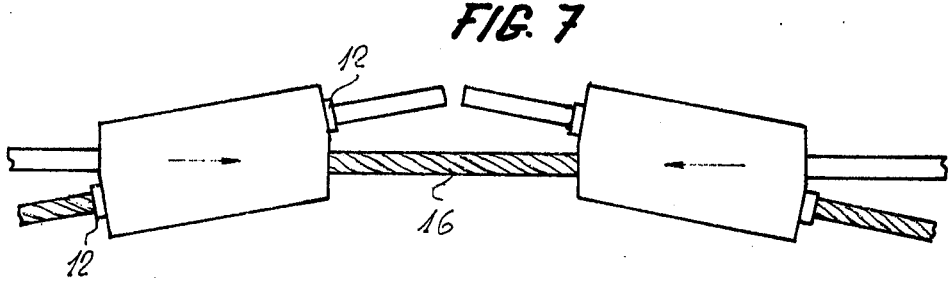
FIG. 7 is a view corresponding to that of FIG. 4, showing a connection formed with the device of FIGS. 5 and 6.

The embodiment illustrated in FIGS. 5 to 7 is similar, except that the anchoring means at each end of the block is constituted by a conically flaring mouth 15 of the bore, which receives the split, conical gripping wedge 12 which engages the wire. The mode of use and functioning of the device is similar.

While the invention has been illustrated above by reference to preferred but non-limitative embodiments thereof, it will be understood by those skilled in the art that various changes may be made without departing from the spirit and scope of the invention and it is intended to cover all such changes and modifications by the appended claims.

The bores described in this specification and claims need not, of course, be formed by boring. They may be formed in any suitable manner.

What is claimed is:

1. Connecting device for two wires which are to be placed under tension in series connection, having a rigid block which has two opposite ends and two substantially parallel bores extending from one end to the other to receive the wires, and two anchoring means respectively associated with the bores adapted to anchor the tensioned lengths of the wires respectively at the opposite ends of the block against the applied tension when the said tensioned lengths extend through the bores, the anchoring means comprising wedges received in tapering orifices and adapted to grip the wires, the said tapering orifices of the anchoring means being in members separate from the said rigid block and adapted to abut the ends of the block, each end face of the block having two facets through which respectively the said bores open, one of the facets being substantially perpendicular to the bore which opens through it and being for abutment by the associated anchoring means, and the other being at such an angle to the bore which opens through it that it is substantially perpendicular to a common axis of the connected wires.

* * * * *